United States Patent
Monforte et al.

(10) Patent No.: US 11,651,311 B2
(45) Date of Patent: May 16, 2023

(54) TECHNIQUES FOR FORECASTING SOLAR POWER GENERATION

(71) Applicant: ITRON, INC., Liberty Lake, WA (US)

(72) Inventors: Frank Monforte, San Diego, CA (US); Andrew Sukenik, San Diego, CA (US)

(73) Assignee: ITRON INC., Liberty Lake, WA (US)

( * ) Notice: Subject to any disclaimer, the term of this patent is extended or adjusted under 35 U.S.C. 154(b) by 923 days.

(21) Appl. No.: 16/393,136

(22) Filed: Apr. 24, 2019

(65) Prior Publication Data

US 2020/0099226 A1 Mar. 26, 2020

Related U.S. Application Data

(60) Provisional application No. 62/734,189, filed on Sep. 20, 2018.

(51) Int. Cl.
*H02J 3/38* (2006.01)
*G06Q 50/06* (2012.01)
(Continued)

(52) U.S. Cl.
CPC .............. *H02J 3/385* (2013.01); *G01W 1/10* (2013.01); *G01W 1/12* (2013.01); *G06Q 10/04* (2013.01);
(Continued)

(58) Field of Classification Search
CPC ........ H02J 3/385; H02J 3/003; H02J 2203/20; H02J 13/00022; H02J 3/004;
(Continued)

(56) References Cited

U.S. PATENT DOCUMENTS

RE29,476 E 11/1977 Monforte et al.
9,320,926 B2 4/2016 Ryba-White et al.
(Continued)

FOREIGN PATENT DOCUMENTS

CN 102566435 A 7/2012
WO 2015/104281 A1 7/2015

OTHER PUBLICATIONS

Raymer, S., "PV System Site Assessment." SolPowerPeople, Inc., May 30, 2013, at https://www.slideshare.net/solpowerpeople/053013-pv-system-site-assessment-1.
(Continued)

*Primary Examiner* — Ziaul Karim
(74) *Attorney, Agent, or Firm* — Artegis Law Group, LLP

(57) ABSTRACT

A forecast engine generates a clear-sky solar power generation level corresponding to a photovoltaic installation that resides within a geographical area. The clear-sky solar power generation level indicates an amount of electricity generated by the photovoltaic installation under clear-sky conditions. The forecast engine also generates a measurement device index corresponding to a measurement device that resides proximate to the photovoltaic installation. The measurement device index indicates an amount of cloud cover present at the location where the measurement device resides. The forecast engine then generates a solar power generation forecast for the geographical area based on the clear-sky solar power generation level and the measurement device index.

20 Claims, 6 Drawing Sheets

(51) Int. Cl.
*G01W 1/10* (2006.01)
*G06Q 10/04* (2012.01)
*G01W 1/12* (2006.01)
*G06N 20/00* (2019.01)
*H02J 3/00* (2006.01)

(52) U.S. Cl.
CPC ............ *G06Q 50/06* (2013.01); *G06N 20/00* (2019.01); *H02J 3/003* (2020.01); *H02J 2203/20* (2020.01)

(58) Field of Classification Search
CPC ..... H02J 13/00002; G01W 1/10; G01W 1/12; G06Q 10/04; G06Q 50/06; G06Q 10/06315; G06N 20/00; Y02E 60/00; Y02E 10/56; Y02E 60/7853; Y04S 10/30; Y04S 10/50; Y04S 40/126
See application file for complete search history.

(56) References Cited

U.S. PATENT DOCUMENTS

| | | | |
|---|---|---|---|
| 9,411,073 B1* | 8/2016 | Hoff | G01W 1/12 |
| 9,638,831 B1* | 5/2017 | Hoff | G06Q 10/0635 |
| 9,645,180 B1* | 5/2017 | Hoff | G01W 1/12 |
| 10,523,012 B2 | 12/2019 | Macerini | |
| 10,797,639 B1 | 10/2020 | Hoff | |
| 2010/0000519 A1 | 1/2010 | Zalusky et al. | |
| 2010/0294337 A1 | 11/2010 | Sherman et al. | |
| 2012/0097211 A1* | 4/2012 | Gurfil | H02S 20/10 |
| | | | 136/246 |
| 2012/0201601 A1 | 8/2012 | Rizzo | |
| 2013/0166266 A1* | 6/2013 | Herzig | G01W 1/10 |
| | | | 703/6 |
| 2013/0246010 A1 | 9/2013 | Dershowitz et al. | |
| 2013/0328406 A1 | 12/2013 | Matsuura et al. | |
| 2014/0156322 A1 | 6/2014 | Monforte et al. | |
| 2014/0278107 A1 | 9/2014 | Kerrigan et al. | |
| 2014/0278108 A1* | 9/2014 | Kerrigan | G01W 1/10 |
| | | | 702/3 |
| 2014/0278163 A1 | 9/2014 | Tan et al. | |
| 2014/0289004 A1 | 9/2014 | Monforte et al. | |
| 2015/0073737 A1 | 3/2015 | Inuzuka | |
| 2015/0081124 A1 | 3/2015 | Ekanayake et al. | |
| 2015/0081127 A1* | 3/2015 | Bhageria | H02J 3/38 |
| | | | 700/295 |
| 2015/0189705 A1 | 7/2015 | Ghosh | |
| 2015/0310463 A1 | 10/2015 | Turfboer et al. | |
| 2016/0104138 A1 | 4/2016 | Newell | |
| 2017/0357989 A1 | 12/2017 | Turfboer et al. | |
| 2018/0188301 A1* | 7/2018 | McBrearty | G01R 22/10 |
| 2018/0196092 A1* | 7/2018 | McBrearty | H02J 3/381 |
| 2018/0262011 A1 | 9/2018 | Itaya | |
| 2018/0351364 A1 | 12/2018 | Pawlik | |
| 2019/0146540 A1* | 5/2019 | Li | H02M 3/1584 |
| | | | 363/95 |

OTHER PUBLICATIONS

Firstgreen Consulting, "Differentiate Between the DNI, DHI and GHI?", Apr. 26, 2012, at https://firstgreenconsulting.wordpress.com/2012/04/26/differentiate-between-the-dni-dhi-and-ghi/.

"Eng Home | ITACA", ITACA, at https://www.itacanet.org/eng-home/, retrieved Apr. 10, 2020.

"NOAA Solar Calculator," National Oceanic & Atmospheric Administration, at https://www.esrl.noaa.gov/gmd/grad/solcalc/, retrieved Apr. 8, 2020.

"PVWatts Calculator," National Renewable Energy Laboratory, at https://pvwatts.nrel.gov/, retrieved Apr. 8, 2020.

"Solar irradiance," Wikipedia.org, at https://en.wikipedia.org/wiki/Solar_irradiance, retrieved Apr. 10, 2020.

"Solar power calculator | Calculate your solar potential," Solar Calculator, at https://solarcalculator.com.au/, retrieved Apr. 8, 2020.

International Search Report for application No. PCT/US2019/050193 dated Nov. 8, 2019.

Non-Final Office Action received for U.S. Appl. No. 16/421,326, dated Mar. 9, 2021, 20 pages.

Yano et al., "Prototype semi-transparent photovoltaic modules for greenhouse roof applications", http://dx.doi.prg/10.1016/j.biosystemseng.2014.04.003, 12 pages.

Gobhinath et al., "A Prototype Development of MPPT Algorithm based Solar Photovoltaic Charging System", vol. 6, Issue 2, Apr. 2016, pp. 139-143.

Liu et al., "High-Efficiency Isolated Photovoltaic Microinverter Using Wide-Band Gap Switches for Standalone and Grid-Tied Applications", doi:1033.90/en11030569, 2018, 15 pages.

Murnane, Martin, "Isolation Technology Helps Integrate Solar Photovoltaic Systems onto the Smart Grid", Sep. 2012, 3 pages.

Final Office Action received for U.S. Appl. No. 16/421,326, dated Jun. 29, 2021,14 pages.

Advisory Action received for U.S. Appl. No. 16/421,326, dated September?, 2021, 2 pages.

Notice of Allowance received for U.S. Appl. No. 16/421,326, dated Oct. 25, 2021, 24 pages.

Notice of Allowance received for U.S. Appl. No. 17/672,450 dated Mar. 8, 2023, 39 pages.

* cited by examiner

TECHNIQUES FOR FORECASTING SOLAR POWER GENERATION

CROSS-REFERENCE TO RELATED APPLICATIONS

This application claims the priority benefit of United States provisional patent application titled, "Leveraging Data Collection Networks to Estimate Behind-the-Meter Solar Generation," filed on Sep. 20, 2018 and having Ser. No. 62/734,189. The subject matter of this related application is hereby incorporated herein by reference.

BACKGROUND

Field of the Various Embodiments

Embodiments of the present invention relate generally to wireless network communications and systems and, more specifically, to techniques for forecasting solar power generation.

Description of the Related Art

Electricity providers typically distribute electricity via an electricity distribution infrastructure to one or more downstream locations within a given area. For example, an electricity provider could distribute electricity via a power grid to various residences within a given county. Electricity providers usually monitor the distribution and/or consumption of electricity in real time in order to scale electricity production in response to varying levels of demand. For example, an electricity provider could remotely read electricity meter data associated with one or more downstream locations in order to estimate how much electricity needs to be generated to meet a current level of demand for electricity.

In the same vein, electricity providers oftentimes analyze historical electricity consumption data in an effort to make predictions regarding future demand for electricity. Based on these predictions, electricity providers can pre-emptively scale electricity production to meet anticipated demand, thereby improving the efficiency with which electricity is provided. For example, an electricity provider could identify one or more specific times of day when electricity consumption has historically exceeded normal levels. The electricity provider could then increase electricity production to prepare for the specific time(s) of day when increased electricity consumption is expected to occur.

With the introduction of various types of renewable energy, such as solar energy, the amount of electricity that is consumed within a given area can be offset, to a certain degree, by the amount of electricity that can be generated by solar power systems within that area. Accordingly, the amount of electricity that needs to be generated for the given area is equal to the demand for electricity less the amount of electricity that is generated via solar power systems. To accurately predict the amount of electricity that needs to be generated for the given area at any given time, the electricity provider needs to be able to predict the amount of electricity that is generated by solar power systems within the given area at any given time.

One problem that electricity providers encounter, though, is that predicting the amount of electricity that can be generated by the various solar power systems within a given area can be quite difficult. In particular, solar power systems generally have widely varying capabilities with respect to generating solar power. For example, one solar power system could have ten photovoltaic panels that are optimally oriented relative to the trajectory of the sun, while another solar power system could have one photovoltaic panel that is poorly oriented relative to the trajectory of the sun. These two solar power systems would generate vastly different amounts of electricity on most, if not all, days. Further, the amount of electricity generated by a given solar power system varies based on seasonal fluctuations in solar irradiance, weather conditions, and other environmental factors. For example, a given solar power system would typically generate greater amounts of electricity on clear summer days than on cloudy winter days.

As a general matter, electricity providers lack the ability to reliably determine the amount of electricity that can be generated by solar power systems within a given area and therefore cannot accurately predict how much electricity needs to be generated at any given time. Consequently, electricity providers can have difficulty scaling electricity production to meet anticipated needs, thereby reducing the efficiency with which electricity can be distributed to consumers.

As the foregoing illustrates, what is needed in the art are more effective ways to predict the amount of electricity generated by solar power systems within a given area.

SUMMARY

Various embodiments include a computer-implemented method, including generating a first clear-sky solar power generation level corresponding to a first photovoltaic installation, wherein the first clear-sky solar power generation level indicates an amount of electricity generated by the first photovoltaic installation under clear-sky conditions, generating a first measurement device index corresponding to a first measurement device, wherein the first measurement device index indicates an amount of cloud cover present at a location where the first measurement device resides, and generating a solar power generation forecast for a geographical area based, at least in part, on the first clear-sky solar power generation level and the first measurement device index.

At least one technological advantage of the disclosed techniques relative to the prior art is that solar power generation can be accurately predicted within a given geographical area, allowing electricity providers to scale electricity production to meet anticipated demand within the geographical area. As a result, electricity providers can supply electricity to consumers with greater efficiency.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
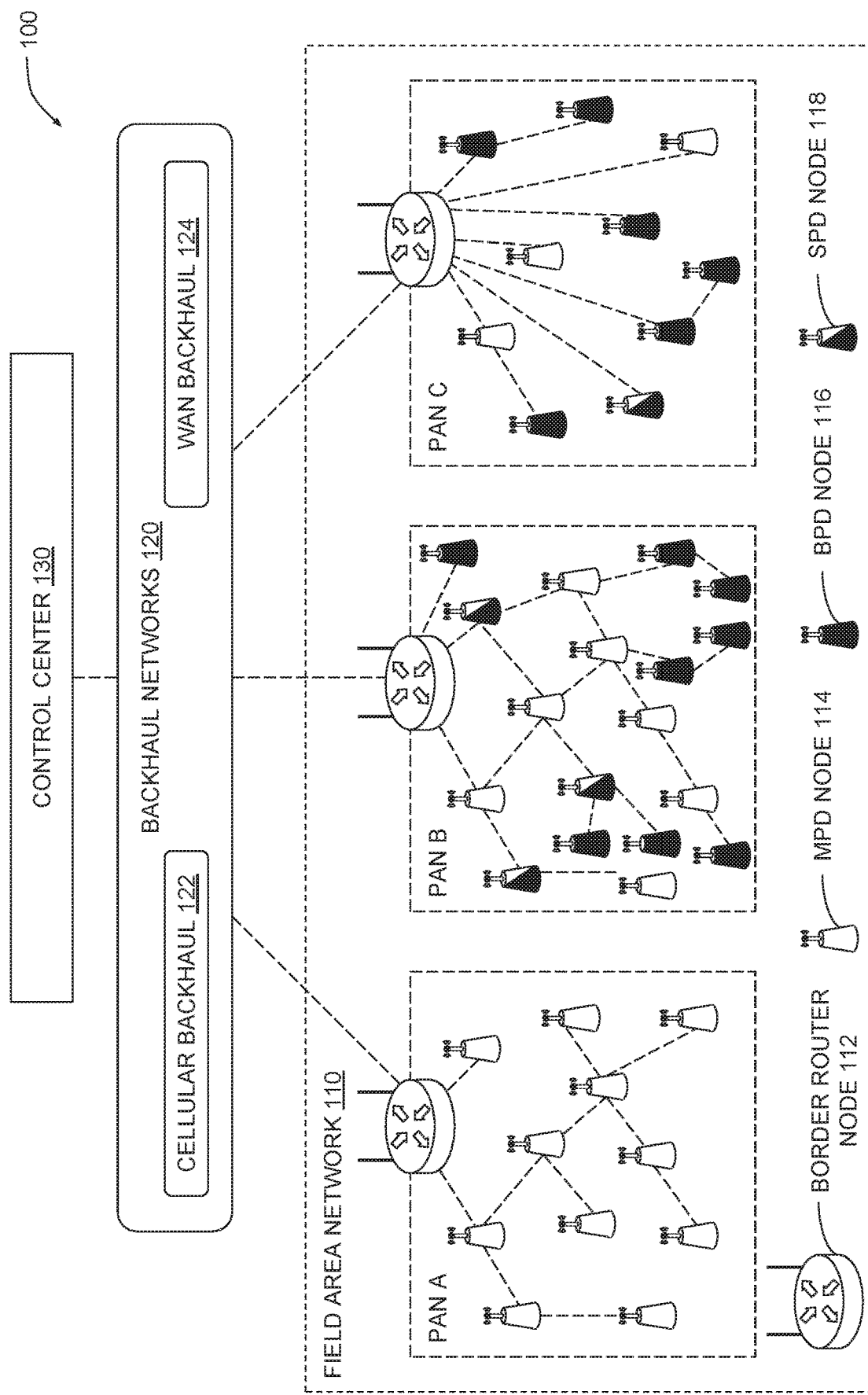
FIG. 1 illustrates a network system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

As noted above, electricity providers oftentimes make predictions regarding future demand for electricity in order to pre-emptively scale electricity production to meet anticipated demand. However, the demand for electricity within a given region at any given time depends on both the amount of electricity that is consumed within the given area at the given time and the amount of electricity that is generated by solar power systems within the given area at the given time. Accordingly, to accurately predict the demand for electricity within the given region, the electricity provider needs to predict the amount of electricity that can be generated by solar power systems within the given region at the given time.

Predicting the amount of electricity that can be generated by solar power systems within a given area can be quite difficult, though, for several reasons. First, different solar power systems can generate different amounts of electricity. Second, the amount of electricity generated by a given solar power system depends on various environmental factors. Consequently, electricity providers can have difficulty predicting the demand for electricity at any given time and may therefore have a limited ability to scale electricity production to meet anticipated demand.

To address these issues, various embodiments include a forecast engine that is configured to forecast solar power generation within a given geographical area. The forecast engine divides the geographical area into various solar regions having differing clear-sky insolation parameters. The forecast engine then assigns a specific solar region to each photovoltaic (PV) installation within the geographical region. The forecast engine also identifies a set of measurement device (MD) nodes within the geographical area that are capable of measuring solar insolation and assigns one or more MD nodes to each PV installation. For any given PV installation, the forecast engine determines a prototype PV installation that can be used to estimate clear-sky solar power generation output. The forecast engine generally performs the above operations offline in preparation for real-time forecasting operations.

Subsequently, to perform real-time forecasting operations, the forecast engine analyzes real-time measurement data output by the MD nodes representing current insolation levels at various locations within the geographical area. Based on this analysis, the forecast engine generates an MD index for each MD node that represents a current amount of cloud cover. The forecast engine scales the clear-sky solar power generation output of each PV installation based on the MD indices generated for the assigned MD nodes to generate an estimated PV installation solar power generation output corresponding to each location in the geographical area for a current point in time. Based on the estimated PV installation output for the current point in time, and based on various historical data and/or real-time data, the forecast engine generates a solar power generation forecast for the geographical area.

At least one technological advantage of the disclosed techniques relative to the prior art is that solar power generation can be accurately predicted within a given geographical area, allowing electricity providers to scale electricity production to meet anticipated demand within the geographical area. As a result, electricity providers can supply electricity to consumers with greater efficiency. Another technological advantage of the disclosed techniques is that solar power generation can be approximated with reasonable accuracy independently of environmental factors such as cloud cover, allowing electricity providers to scale electricity production independently of seasonal changes, weather patterns, and so forth. Yet another technological advantage of the disclosed techniques is that the current level of cloud cover at a given location can be accurately estimated and used to improve the accuracy of approximations of solar power generation that do not consider environmental factors such as cloud cover. These technological advantages represent one or more technological advancements relative to prior art approaches.

System Overview

FIG. 1 illustrates a network system configured to implement one or more aspects of the present embodiments. As shown, network system 100 includes a field area network (FAN) 110, backhaul networks 120, and a control center 130. FAN 110 is coupled to control center 130 via backhaul networks 120. Backhaul networks 120 include a cellular backhaul 122 that supports Internet protocol (IP) routing as well as a wide-area network (WAN) backhaul 124 that similarly support IP routing. Control center 130 is configured to coordinate the operation of FAN 110 via communications across cellular backhaul 122 and WAN backhaul 124.

FAN 110 includes personal area network (PANs) A, B, and C. PANs A and B are organized according to a mesh network topology, while PAN C is organized according to a star network topology. Each of PANs A, B, and C includes at least one border router node 112 and one or more mains-powered device (MPD) nodes 114.

PANs B and C further include one or more battery-powered device (BPD) nodes 116 and one or more solar-powered device (SPD) nodes 118.

MPD nodes 114 draw power from an external power source, such as mains electricity or a power grid. MPD nodes 114 typically operate on a continuous basis without powering down for extended periods of time. BPD nodes 116 draw power from an internal power source, such as a battery. BPD nodes 116 typically operate intermittently and power down for extended periods of time in order to conserve battery power. SPD nodes 118 include solar panels that generate power from sunlight. SPD nodes 118 store generated power in secondary cells and draw power from those secondary cells to support node operations.

MPD nodes 114, BPD nodes 116, and SPD nodes 118 are coupled to, or included within, a utility distribution infrastructure (not shown) that distributes a resource to consumers. MPD nodes 114, BPD nodes 116, and SPD nodes 118 gather sensor data related to the distribution of the resource, process the sensor data, and communicate processing results and other information to control center 130. Border router nodes 112 operate as access points to provide MPD nodes 114, BPD nodes 116, and SPD nodes 118 with access to control center 130.

Any of border router nodes 112, MPD nodes 114, BPD nodes 116, and SPD nodes 118 are configured to communicate directly with one or more adjacent nodes via bi-directional communication links. The communication links may be wired or wireless links, although in practice, adjacent nodes of a given PAN exchange data with one another by transmitting data packets via wireless radio frequency (RF) communications. The various node types are configured to perform a technique known in the art as "channel hopping" in order to periodically receive data packets on varying channels. As known in the art, a "channel" may correspond to a particular range of frequencies. In one embodiment, a node may compute a current receive channel by evaluating a Jenkins hash function based on a total number of channels and the media access control (MAC) address of the node.

Each node within a given PAN may implement a discovery protocol to identify one or more adjacent nodes or "neighbors." A node that has identified an adjacent, neighboring node may establish a bi-directional communication link with the neighboring node. Each neighboring node may update a respective neighbor table to include information concerning the other node, including the MAC address of the other node as well as a received signal strength indication (RSSI) of the communication link established with that node.

Nodes may compute the channel hopping sequences of adjacent nodes to facilitate the successful transmission of data packets to those nodes. In embodiments where nodes implement the Jenkins hash function, a node computes a current receive channel of an adjacent node using the total number of channels, the MAC address of the adjacent node, and a time slot number assigned to a current time slot of the adjacent node.

Any of the nodes discussed above may operate as a source node, an intermediate node, or a destination node for the transmission of data packets. A given source node may generate a data packet and then transmit the data packet to a destination node via any number of intermediate nodes (in mesh network topologies). The data packet may indicate a destination for the packet and/or a particular sequence of intermediate nodes to traverse in order to reach the destination node. In one embodiment, each intermediate node may include a forwarding database indicating various network routes and cost metrics associated with each route.

In addition, any of the nodes discussed above can be configured to operate as access points for other nodes included in FAN 110. For example, one or more MPD nodes 114 and one or more SPD nodes 118 could be configured as access points for different or overlapping portions of FAN 110. Further, those MPD node(s) 114 and SPD node(s) 118 could be configured to coordinate load balancing of network traffic across different backhaul networks 120.

Nodes may transmit data packets across a given PAN and across one or more backhaul networks 120 to control center 130. Similarly, control center 130 may transmit data packets across one or more backhaul networks 120 and across any given PAN to a particular node included therein. As a general matter, numerous routes may exist which traverse any of PANs A, B, and C and include any number of intermediate nodes, thereby allowing any given node or other component within network system 100 to communicate with any other node or component included therein.

Control center 130 includes one or more server machines configured to operate as sources for, or destinations of, data packets that traverse within network system 100. The server machines may query nodes within network system 100 to obtain various data, including raw or processed sensor data, power consumption data, node/network throughput data, status information, and so forth. The server machines may also transmit commands and/or program instructions to any node within network system 100 to cause those nodes to perform various operations. In one embodiment, each server machine is a computing device configured to execute, via a processor, a software application stored in a memory to perform various network management operations, as described in greater detail below in conjunction with FIG. 4.

Nodes may likewise include computing device hardware configured to perform processing operations and execute program code. Each node may further include various analog-to-digital and digital-to-analog converters, digital signal processors (DSPs), harmonic oscillators, transceivers, and any other components generally associated with RF-based communication hardware, as described in greater detail below in conjunction with FIG. 3.

Figure 2:
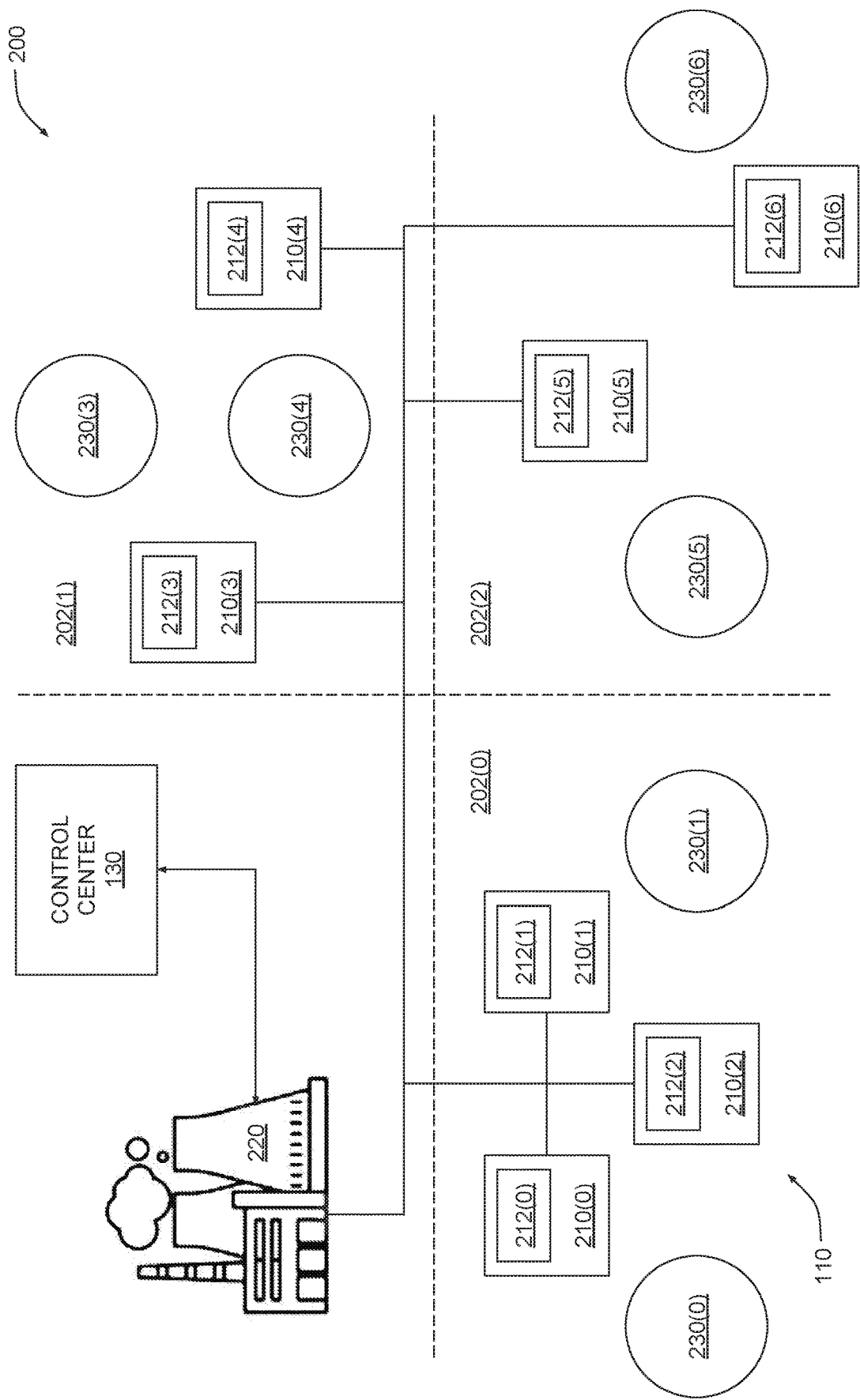
FIG. 2 illustrates a geographical area where the network system of FIG. 1 can be deployed, according to various embodiments.

Any of border router nodes 112, MPD nodes 114, BPD nodes 116, and SPD nodes 118 can be configured as an MD node that is configured to measure the current level of insolation at a particular location and report the current level of insolation, periodically and/or in real time, to control center 130. As referred to herein, the term "insolation" refers to the amount of solar radiation that reaches a given location. FIG. 2 illustrates a set of MD nodes deployed across a geographical area in conjunction with FAN 110 of FIG. 1.

FIG. 2 illustrates a geographical area where the FAN of FIG. 1 can be deployed, according to various embodiments. As shown, geographical area 200 is divided into different solar regions 202 that include various premises 210 configured with different PV installations 212. A given premise 210 could be, for example, a residence where one or more solar panels are installed, a commercial building that is configured with a solar power system, a parking lot that includes a solar panel canopy, and so forth. Each premise 210 is coupled to an electricity provider 220 that supplies electricity to the different premises 210 via an electricity distribution infrastructure. Electricity provider 220 is coupled to control center 130 of FIG. 1.

As mentioned above in conjunction with FIG. 1, any of border router nodes 112, MPD nodes 114, BPD nodes 116, and SPD nodes 118 of FIG. 1 can be configured as a measurement device that measures the current level of insolation at a particular location. As is shown, various nodes that are configured as MD nodes 230 are deployed within geographical area 200 in conjunction with FAN 110. MD nodes 230 are coupled to control center 130 via wired or wireless connections. Each MD node 230 can communicate with control center 130 directly or via one or more intermediate nodes that may or may not be configured as MD nodes 230.

Control center 130 is configured to obtain measurement data from MD nodes 230 indicating the current levels of insolation at the locations where MD nodes 230 are deployed. Based on this measurement data and various other data, control center 130 generates forecast data. The forecast data indicates a predicted amount of electricity generated by PV installations 212 within geographical area 200 over some future interval. Based on the forecast data, electricity provider 220 can scale electricity production up or down in order to meet anticipated demand for electricity.

For example, if control center 130 forecasts an increase in solar power generation over a subsequent fifteen-minute interval, then electricity provider 220 could scale down electricity production during that fifteen-minute interval. In this situation, electricity provider 220 could scale electricity production down because the increase in solar power generation would at least partially offset the current demand for electricity.

Similarly, if control center 130 forecasts a decrease in solar power generation over a subsequent fifteen-minute interval, then electricity provider 220 could scale electricity production up during that fifteen-minute interval. In this situation, electricity provider 220 would scale electricity production up in order to compensate for the predicted decrease in solar power generation.

Hardware Overview

Figure 3:
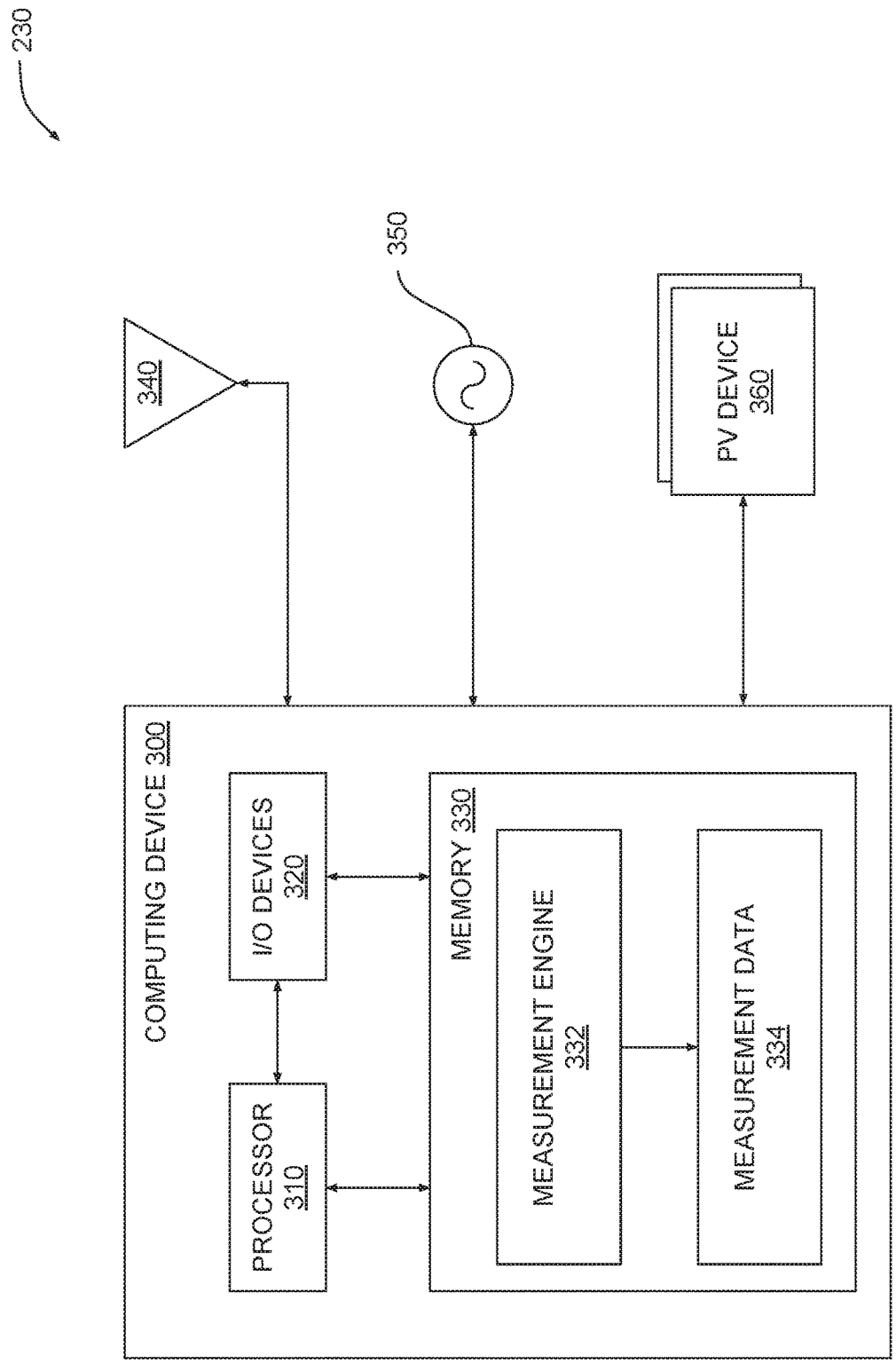
FIG. 3 is a more detailed illustration of one of the measurement device nodes of FIG. 2, according to various embodiments.

FIG. 3 is a more detailed illustration of one of the MD nodes of FIG. 2, according to various embodiments. As shown, an MD node 230 includes a computing device 300 coupled to a transceiver 340, an oscillator 350, and a PV device 360. Computing device 300 coordinates the operations of MD node 230. Transceiver 340 is configured to transmit and receive data packets across network system 100 using a range of channels and power levels. Oscillator 350 provides one or more oscillation signals according to which the transmission and reception of data packets can be scheduled. PV device 360 generates real-time measurements indicating the current insolation level at the location where MD node 230 is deployed.

Computing device 300 includes a processor 310, input/output (I/O) devices 320, and memory 330, coupled together. Processor 310 may include any hardware configured to process data and execute software applications. Processor 310 may include a real-time clock (RTC) (not shown) according to which processor 310 maintains an estimate of the current time. I/O devices 320 include devices configured to receive input, devices configured to provide output, and devices configured to both receive input and provide output. Memory 330 may be implemented with any technically feasible storage medium.

Memory 330 includes a measurement engine 332 and measurement data 334. Measurement engine 332 includes program code that, when executed by processor 212, interacts with PV device 360 to generate measurement data 334 representing the current insolation level at the location where MD node 230 is deployed. Measurement engine 332 also transmits measurement data 334 to control center 130 in real time and/or at periodic intervals. Control center 130 is described in greater detail below in conjunction with FIG. 4.

Figure 4:
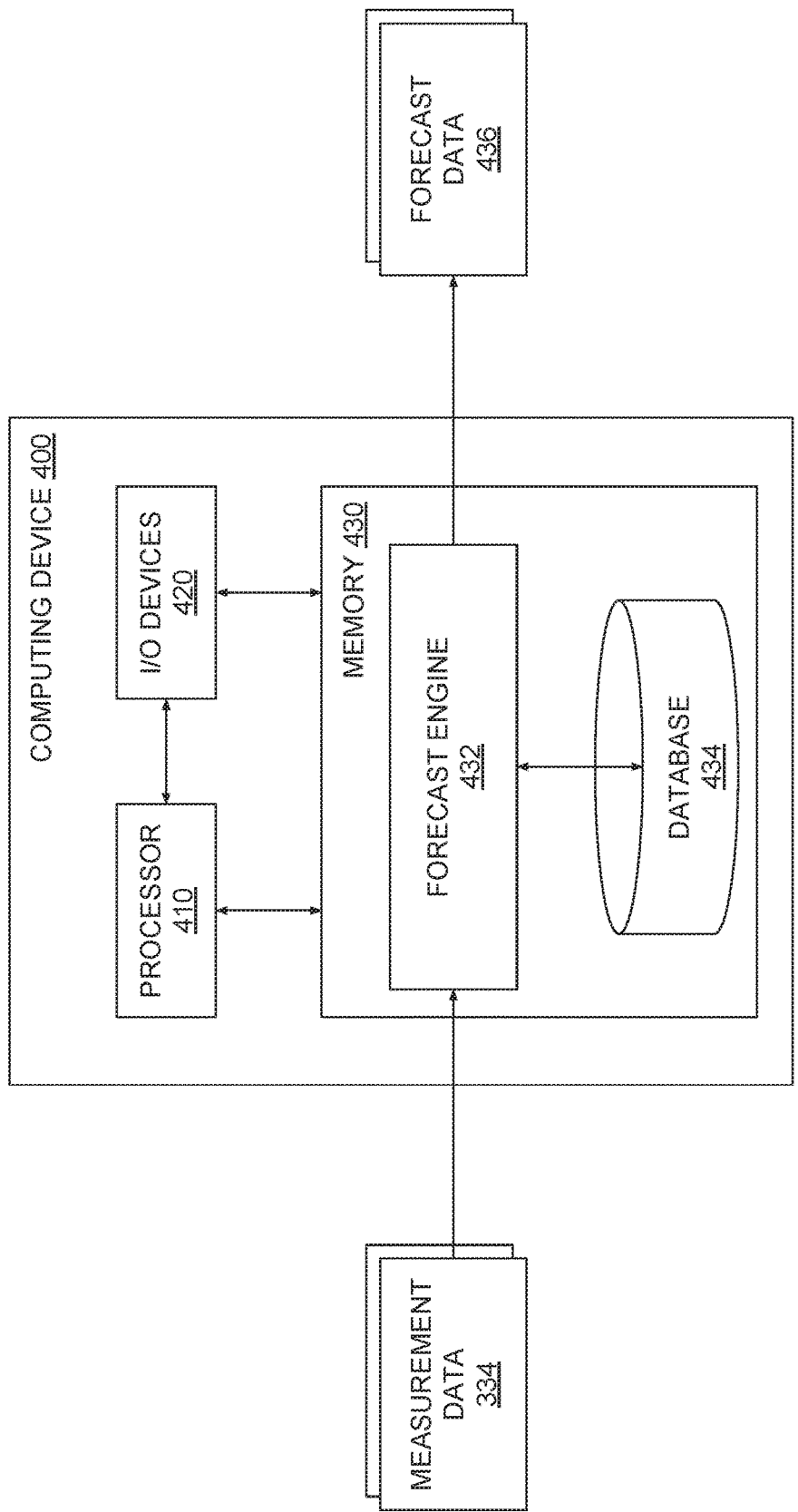
FIG. 4 is a more detailed illustration of the control center of FIG. 2, according to various embodiments.

FIG. 4 is a more detailed illustration of the control center of FIG. 2, according to various embodiments. As shown, control center 130 includes one or more computing devices 400. Each computing device 400 may, in some embodiments, be configured as a server computing device within a datacenter associated with control center 130. The one or more computing devices 400 generally coordinate the operations of FAN 110, and, specifically, interact with MD nodes 230 in order to generate forecast data, as discussed above in conjunction with FIG. 2.

Computing device 400 includes a processor 410, input/output (I/O) devices 420, and memory 430, coupled together. Processor 410 may include any hardware configured to process data and execute software applications. I/O devices 420 include devices configured to receive input, devices configured to provide output, and devices configured to both receive input and provide output. Memory 430 may be implemented by any technically feasible storage medium.

Memory 430 includes a forecast engine 432 and a database 434, coupled together. Forecast engine 432 includes program code that, when executed by processor 410, processes measurement data 334 received from MD nodes 230 in conjunction with various other data stored in database 434 to generate forecast data 436. Forecast data 436 represents a real-time prediction of solar power generation within geographical area 200 over a future interval. In order to generate forecast data 436, forecast engine 432 executes nine separate processes that are described in greater detail below in conjunction with FIG. 5.

Forecast Engine Software Description

Figure 5:
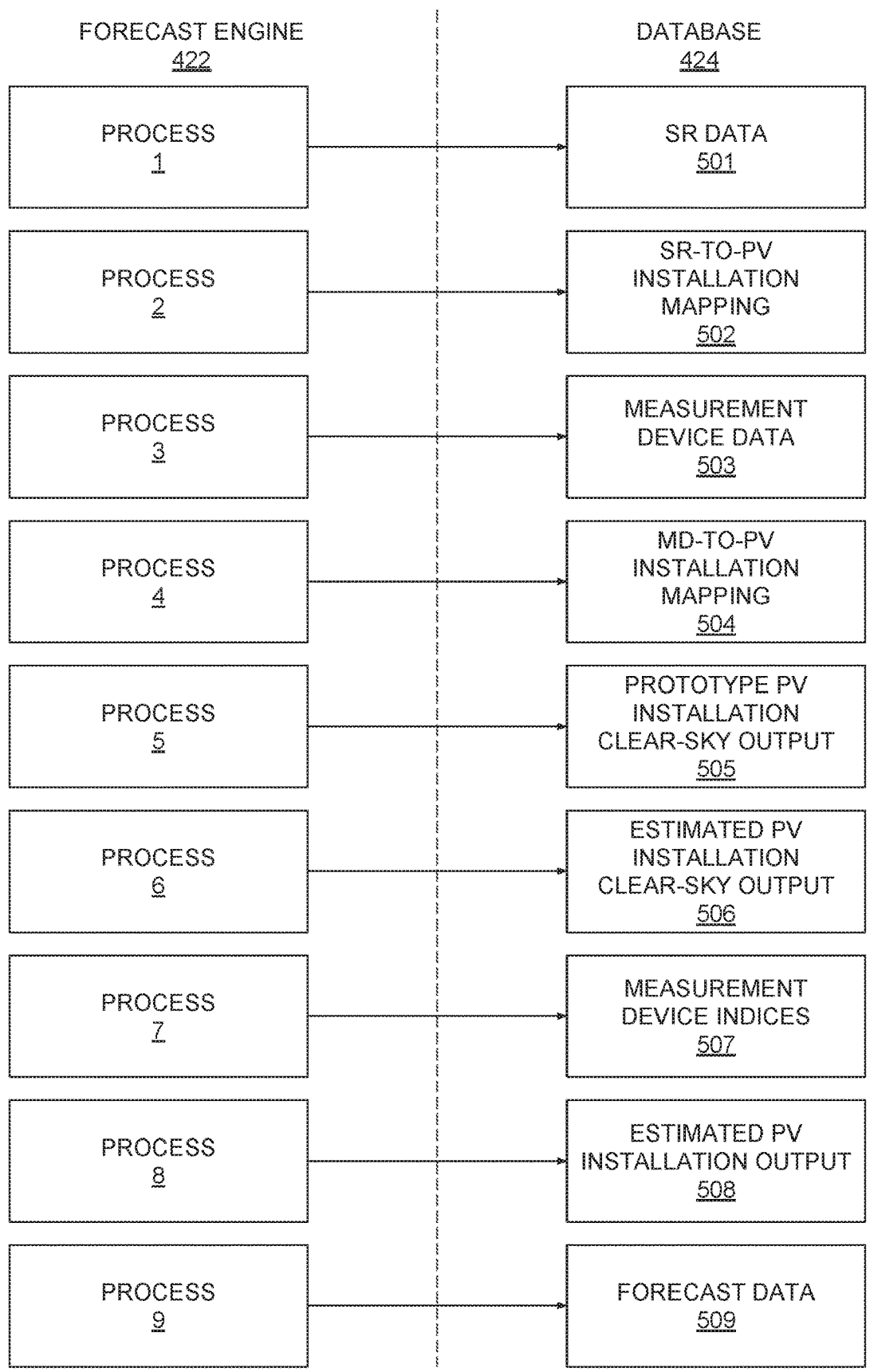
FIG. 5 is a more detailed illustration of the forecast engine of FIG. 4, according to various embodiments.

FIG. 5 is a more detailed illustration of the forecast engine of FIG. 4, according to various embodiments. As shown, forecast engine 432 includes processes 1, 2, 3, 4, 5, 6, 7, 8 and 9. Forecast engine 432 executes processes 1-9 in order to forecast solar power generation within geographical region 200 in the manner previously described. In one embodiment, forecast engine 432 may execute processes 1-6 offline before solar power generation forecasting is to occur. Subsequently, forecast engine 432 may execute processes 7-9 in real time in order to perform real-time solar power generation forecasting. Forecast engine 432 executes processes 1-9 based on various data that is described in greater detail below. When executing processes 1-9, forecast engine 432 generates and stores various data in database 434, as described in greater detail herein.

When executing process 1, forecast engine 432 divides geographical area 200 into the different solar regions 202 discussed above in conjunction with FIG. 2 to generate solar region data (SR data) 501. SR data 501 indicates one or more different types of boundaries that define regions with similar insolation characteristics. Forecast engine 432 can generate SR data 501 based on physical connectivity between premises 210 and various elements of the electricity distribution infrastructure, including substations, transformers, and so forth. Alternatively, forecast engine 432 can generate SR data 501 based on geospatial boundaries, including zip codes, city/county boundaries, and so forth. Forecast engine 432 can also generate SR data 501 based on climate zones associated geographical area 200. SR data 501 includes latitude and longitude data for the centroid of each solar region defined in SR data 501, as well as clear-sky insolation values for each such centroid.

When executing process 2, forecast engine 432 assigns a different solar region to each PV installation 212 within geographical area 200 to generate SR-to-PV installation mapping 502. SR-to-PV installation mapping 502 indicates, for each PV installation 212 and corresponding premise 210, a specific solar region set forth in SR data 501. SR-to-PV installation mapping 502 also indicates location information associated with each premise, such as address, latitude, longitude, and so forth, and system information associated with each PV installation 212, such as system capacity, operating efficiency, and other system characteristics.

When executing process 3, forecast engine 432 collects data associated with each MD node 230 to generate MD data 503. MD data 503 indicates, for any given MD node 230, the type of measurement device, installation parameters associated with the MD node, data output parameters associated with the MD node, and other measurement device-specific data. Based on location data included in MD data 503, forecast engine 432 assigns a solar region to each MD node 230 and then updates MD data 503 to indicate, for each MD node 230, the assigned solar region.

When executing process 4, forecast engine 432 maps one or more MD nodes 230 to each different PV installation 212 to generate MD-to-PV installation mapping 504. For a given PV installation 212, forecast engine 432 analyzes some or all MD nodes 230 and identifies one or more of those MD nodes 230 that can accurately measure the insolation level at the given PV installation 212. In doing so, forecast engine 432 determines the distance between each MD node 230 and the given PV installation 212, the bearing of PV devices 360 associated with each MD node 230 relative to PV panels associated with the given PV installation 212, and a quality of measurement for each MD node 230. Forecast engine 432 then computes a weighted sum of the resultant data to generate a score for each MD node 230. Forecast engine 432 maps the one or more MD nodes 230 having the highest scores to the PV installation 212. By performing the above operations across some or all PV installation 212, forecast engine 432 generates MD-to-PV installation mapping 504.

When executing process 5, forecast engine 432 estimates the output of a set of prototype PV installations under clear-sky conditions to generate prototype PV installation clear-sky output. Forecast engine 432 analyzes data associated with a given PV installation 212 and identifies, within a library of prototype PV installations, a specific prototype PV installation with system characteristics that are similar to the given PV installation 212. Forecast engine 432 then determines the estimated power generation output of the prototype PV installation within the solar region assigned to the given PV installation 212 under clear-sky conditions. In doing so, forecast engine 432 could, for example, evaluate a parametric model of a prototype PV installation to estimate solar power generation for the prototype PV installation. In one embodiment, forecast engine 432 may execute process 5 to generate output estimates for each combination of prototype PV installation and solar region.

When executing process 6, forecast engine 432 estimates the output of each PV installation 212 under clear-sky conditions to generate estimated PV installation clear-sky output 506. Forecast engine 432 analyzes the prototype PV installation clear-sky output for a given PV installation 212 and scales that estimated output based on one or more configuration parameters associated with the given PV installation 212. For example, if the given PV installation 212 includes N solar panels, and the corresponding prototype PV installation is defined for 1 panel, then forecast engine 432 could multiple the output of the prototype PV installation by N to arrive at an estimated output for the PV installation 212. Forecast engine 432 performs these operations across some or all PV installations to generate estimated PV installation clear-sky output 506.

When executing process 7, forecast engine 432 processes measurement data 334 provided by MD nodes 230 to generate MD indices 507. Each MD index 507 indicates the current level of cloud cover at the location where a corresponding MD node 230 resides. To generate a given MD index 507 for a corresponding MD node 230 at a specific date and time, forecast engine 432 computes the maximum expected output of the corresponding MD node 230 at the specific date and time. Forecast engine 432 then scales the measurement data 334 associated with the corresponding MD node 230 relative to that maximum expected output to produce the given MD index, which is a value between zero and one. Forecast engine 432 can determine the maximum expected output of the given MD node 230 at the specific date and time based on historical measurement data and/or clear-sky insolation estimates corresponding to the location where the given MD node 230 resides.

When executing process 8, forecast engine computes the estimate solar power generation for each PV installation 212 to generate estimated PV installation output 508. To generate the estimated PV installation output 508 for a given PV installation 212, forecast engine 432 first identifies the MD node 230 corresponding to the given PV installation 212 based on MD-to-PV installation mapping 504 generated via process 4. Forecast engine 432 then determines, based on MD indices 507, the particular MD index associated with that MD node 230. Finally, forecast engine 432 multiplies the estimated PV installation clear-sky output 506 associated with the given PV installation 212 by the MD index. In this fashion, forecast engine 432 scales the estimated PV installation clear-sky output relative to an estimate of the current level of cloud cover. The resultant estimated PV installation output 508 represents the total amount of electricity that is produced within geographical area 200 at the current time.

When executing process 9, forecast engine 432 processes the estimated PV installation output 508 that is generated via process 8 and then applies a predictive model to extrapolate this data over some future interval to generate forecast data 509. Forecast data 509 indicates the predicted solar power generation across geographical area 200. Forecast engine 432 can implement Machine Learning to generate the predictive model. In particular, forecast engine 432 can analyze historical PV installation output and/or historical MD indices in conjunction with historical weather data. Based on this analysis, forecast engine 432 modifies various parameters of the predictive model to describe how PV installation output and/or MD indices change in response to changing weather conditions. Based on forecast data 509, electricity provider 220 advantageously can scale electricity production in proportion to expected changes in solar power generation, thereby increasing the efficiency with which electricity can be supplied to consumers.

Figure 6:
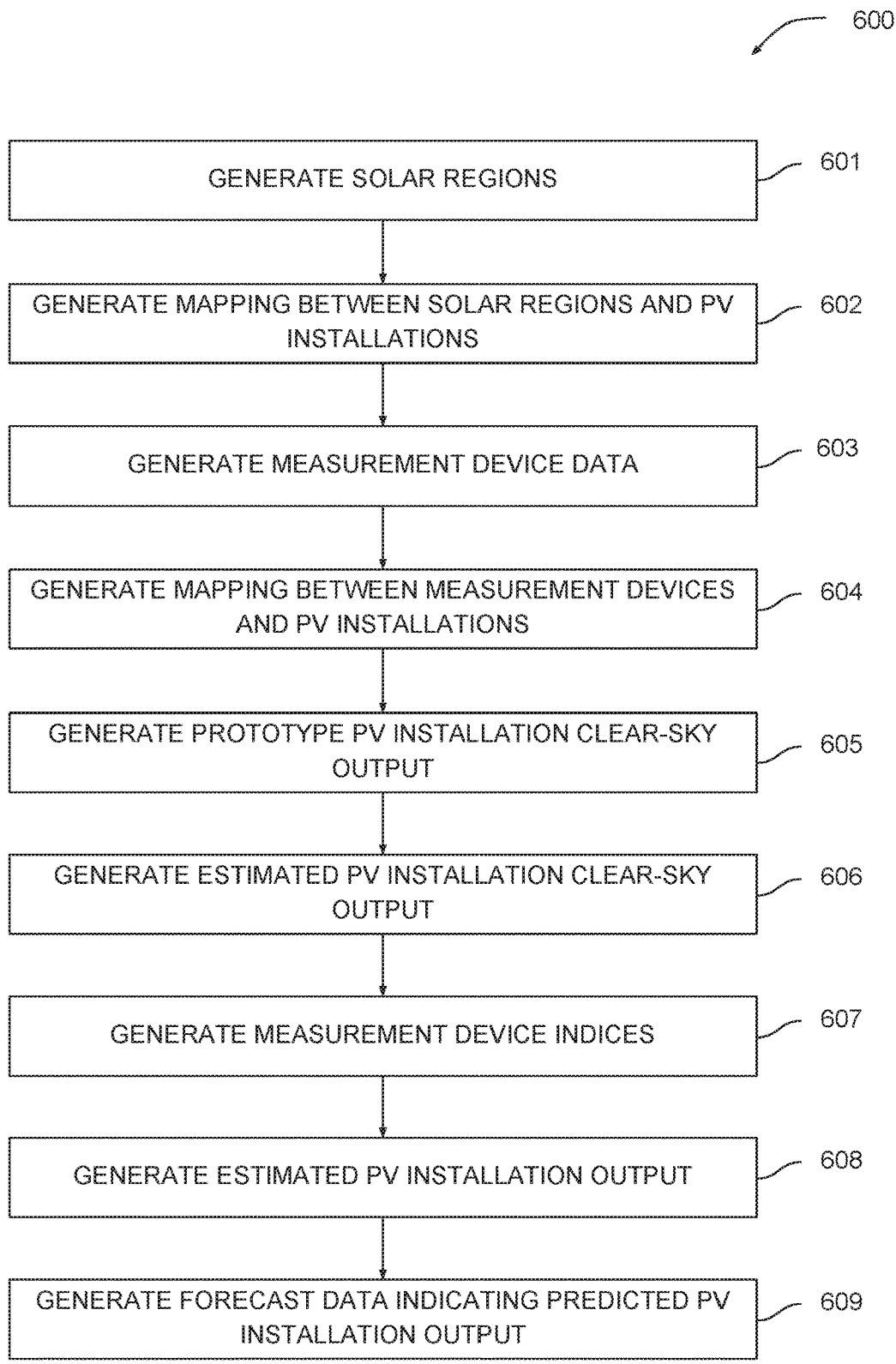
FIG. 6 is a flow diagram of method steps for forecasting solar power generation within a geographical area, according to various embodiments.

FIG. 6 is a flow diagram of method steps for forecasting solar power generation within a geographical area that is serviced by a utility provider, according to various embodiments. Although the method steps are described in conjunction with the systems of FIGS. 1-5, persons skilled in the art will understand that any system configured to perform the method steps in any order falls within the scope of the present embodiments.

As shown, a method 600 begins at step 601, where forecast engine 432 of FIG. 4 generates a set of solar regions 202. Each solar region 202 defines a portion of geographical area 200 having similar insolation parameters. Forecast engine 432 can generate a given solar region based on power grid connectivity, geospatial boundaries, and/or climate zones. Forecast engine 432 performs step 601 when executing process 1 of FIG. 5.

At step 602, forecast engine 432 generates a mapping between solar regions and solar installations. In particular, forecast engine 432 assigns a specific solar region to each different PV installation 212. Forecast engine 432 generally assigns a given solar region to a given PV installation 212 based on the location of the given PV installation 212. Forecast engine 432 performs step 602 when executing process 2 of FIG. 5.

At step 603, forecast engine 432 generates measurement device data. The measurement device data generated via step 603 indicates various installation parameters associated with MD nodes 230 as well as a specific assignment of solar region that is generated by forecast engine 432 based measurement device location. Forecast engine 432 performs step 603 when executing process 3 of FIG. 5.

At step 604, forecast engine 432 generates a mapping between MD nodes and PV installations. In particular, forecast engine 432 determines one or more MD nodes 230 that reside proximate to any given PV installation 212, have similar installation parameters as the given PV installation 212, and provide measurement data with at least a minimum level of quality and associates the given PV installation 212 with the one or more MD nodes 230. Forecast engine 432 performs step 604 when executing process 4 of FIG. 5.

At step 605, forecast engine 432 generates a prototype PV installation clear-sky output for each PV installation. Forecast engine maps each PV installation 212 to a particular prototype PV installation within a library of prototype PV installations. The prototype PV installation for a given PV installation 212 generally has similar system, installation, and/or operational parameters as the given PV installation 212. Forecast engine 432 then estimates the electrical output of each prototype solar PV installation. Specifically, for a given prototype PV installation associated with a given PV installation 212, forecast engine 432 applies a theoretical model of insolation to compute the insolation level at the PV installation 212 and/or within the solar region where the PV installation 212 resides. Forecast engine 432 then applies a theoretical model of solar power generation to compute the output the prototype PV installation based on the computed insolation level. Forecast engine 432 performs step 605 when executing process 5 of FIG. 5.

At step 606, forecast engine 432 generates an estimated PV installation clear-sky output based on the corresponding PV installation clear-sky output generated at step 605. Forecast engine 432 scales the prototype PV installation clear-sky output generated at step 606 based on various system and/or environmental factors associated with each corresponding PV installation 212. Forecast engine 432 performs step 606 when executing process 6 of FIG. 5.

At step 607, forecast engine 432 generates measurement device indices for the various MD nodes analyzed at step 603. A given MD index corresponding to a particular MD node 230 at a particular date and time represents the current level of cloud cover at the particular MD node 230 at the particular date and time. Each MD index is a value between zero and one and is computed by forecast engine 432 based on real-time measurement data 334 and based on an expected maximum output for each MD node 230. Forecast engine 432 performs step 607 when executing process 7 of FIG. 5.

At step 608, forecast engine 432 generates an estimated PV installation output for each PV installation within the geographical area. Forecast engine 432 modifies the estimated PV installation clear-sky output generated via step 606 to correct for the potential presence of cloud cover. In so doing, forecast engine 432 scales each estimated PV installation clear-sky output relative to an MD index associated with a corresponding PV installation. Forecast engine 432 performs step 608 when executing process 8 of FIG. 5.

At step 609, forecast engine 432 generates forecast data indicating predicted PV installation output. Forecast engine 432 implements a predictive model that can be generated by processing historical PV installation output and/or historical MD indices in conjunction with corresponding weather data. Then, forecast engine 432 can apply Machine Learning techniques to model how PV installation output and/or historical MD indices change in response to weather. Forecast engine 432 performs step 609 when executing process 9 of FIG. 5.

In sum, a forecast engine is configured to forecast solar power generation within a given geographical area. The forecast engine divides the geographical area into various solar regions having differing clear-sky insolation parameters. The forecast engine then assigns a specific solar region to each photovoltaic (PV) installation within the geographical region. The forecast engine also identifies a set of measurement device (MD) nodes within the geographical area that are capable of measuring solar insolation and assigns one or more MD nodes to each PV installation. For any given PV installation, the forecast engine determines a prototype PV installation that can be used to estimate clear-sky solar power generation.

The forecast engine then analyzes real-time measurement data output by the MD nodes representing current insolation levels at various locations within the geographical area. Based on this analysis, the forecast engine generates an MD index for each MD node that represents a current amount of cloud cover. The forecast engine scales the clear-sky solar power generation output of each PV installation based on the MD indices generated for the assigned MD nodes to generate an estimated PV installation solar power generation output corresponding to each location in the geographical area for a current point in time. Based on the estimated PV installation output for the current point in time, and based on various historical data and/or real-time data, the forecast engine generates a solar power generation forecast for the geographical area.

At least one technological advantage of the disclosed techniques relative to the prior art is that solar power generation can be accurately predicted within a given geographical area, allowing electricity providers to scale electricity production to meet anticipated demand within the geographical area. As a result, electricity providers can supply electricity to consumers with greater efficiency. Another technological advantage of the disclosed techniques is that solar power generation can be approximated with reasonable accuracy independently of environmental factors such as cloud cover, allowing electricity providers to scale electricity production independently of seasonal changes, weather patterns, and so forth. Yet another technological advantage of the disclosed techniques is that the current level of cloud cover at a given location can be accurately estimated and used to improve the accuracy of approximations of solar power generation that do not consider environmental factors such as cloud cover. These technological advantages represent one or more technological advancements relative to prior art approaches.

1. Some embodiments include a computer-implemented method, comprising generating a first clear-sky solar power generation level corresponding to a first photovoltaic installation, wherein the first clear-sky solar power generation level indicates an amount of electricity generated by the first photovoltaic installation under clear-sky conditions, generating a first measurement device index corresponding to a first measurement device, wherein the first measurement device index indicates an amount of cloud cover present at a location where the first measurement device resides, and generating a solar power generation forecast for a geographical area based, at least in part, on the first clear-sky solar power generation level and the first measurement device index.

2. The computer-implemented method of clause 1, wherein generating the first clear-sky solar power generation level comprises generating an estimated clear-sky solar power generation level based on a first insolation level associated with the first photovoltaic installation, and modifying the estimated clear-sky solar power generation level based on at least one configuration parameter associated with the first photovoltaic installation.

3. The computer-implemented method of any of clauses 1-2, wherein generating the estimated clear-sky solar power generation level comprises evaluating a parametric model of a photovoltaic installation based on the first insolation level.

4. The computer-implemented method of any of clauses 1-3, wherein modifying the estimated clear-sky solar power generation level comprises multiplying the estimated clear-sky solar power generation level by a number of solar panels included in the first photovoltaic installation.

5. The computer-implemented method of any of clauses 1-4, wherein generating the first clear-sky solar power generation level comprises generating a first solar region associated with the geographical area based on at least one physical attribute of the geographical area, assigning the first solar region to the first photovoltaic installation based on a first location where the first photovoltaic installation resides, mapping the first photovoltaic installation to a first prototype photovoltaic installation based on at least one operational parameter associated with the first photovoltaic installation, and evaluating a parametric model of the first prototype photovoltaic installation based on an insolation level associated with the first solar region.

6. The computer-implemented method of any of clauses 1-5, wherein the at least one physical attribute of the geographical area comprises a topology associated with an electricity distribution infrastructure that resides within the geographical area.

7. The computer-implemented method of any of clauses 1-6, wherein the at least one physical attribute of the geographical area comprises a first geospatial boundary that demarcates a first portion of the geographical area.

8. The computer-implemented method of any of clauses 1-7, wherein the at least one physical attribute of the geographical area comprises a first climate zone corresponding to a first portion of the geographical area.

9. The computer-implemented method of any of clauses 1-8, wherein assigning the first solar region to the first photovoltaic installation comprises determining that the first location is included within a first portion of the geographical area that is associated with the first solar region.

10. The computer-implemented method of any of clauses 1-9, wherein mapping the first photovoltaic installation to the first prototype photovoltaic installation comprises determining, based on a library of prototype photovoltaic installations, that the first prototype photovoltaic installation is associated with the at least one operational parameter.

11. Some embodiments include a non-transitory computer-readable medium storing program instructions that, when executed by a processor cause the processor to perform the steps of generating a first clear-sky solar power generation level corresponding to a first photovoltaic installation, wherein the first clear-sky solar power generation level indicates an amount of electricity generated by the first photovoltaic installation under clear-sky conditions, generating a first measurement device index corresponding to a first measurement device, wherein the first measurement device index indicates an amount of cloud cover present at a location where the first measurement device resides, and generating a solar power generation forecast for a geographical area based, at least in part, on the first clear-sky solar power generation level and the first measurement device index.

12. The non-transitory computer-readable medium of clause 11, wherein the step of generating the first clear-sky solar power generation level comprises generating an estimated clear-sky solar power generation level based on a first insolation level associated with the first photovoltaic installation, and modifying the estimated clear-sky solar power generation level based on at least one configuration parameter associated with the first photovoltaic installation.

13. The non-transitory computer-readable medium of any of clauses 11-12, wherein generating the estimated clear-sky solar power generation level comprises evaluating a parametric model of a photovoltaic installation based on the first insolation level.

14. The non-transitory computer-readable medium of any of clauses 11-13, wherein modifying the estimated clear-sky solar power generation level comprises multiplying the estimated clear-sky solar power generation level by a number of solar panels included in the first photovoltaic installation.

15. The non-transitory computer-readable medium of any of clauses 11-14, wherein the step of generating the first measurement device index comprises determining a maximum output level that is associated with the first measurement device and corresponds to a current point in time, determining a current output level that is associated with the first measurement device and corresponds to the current point in time, and scaling the current output level based on the maximum output level to generate a value between zero and one.

16. The non-transitory computer-readable medium of any of clauses 11-15, wherein determining the maximum output level comprises evaluating a historical dataset to determine one or more historical output levels recorded prior to the current point in time, and determining a maximum historical output level within the one or more historical output levels.

17. The non-transitory computer-readable medium of any of clauses 11-16, wherein the step of generating the solar power generation forecast for the geographical area comprises modifying the first clear-sky solar power generation level based on the first measurement device index to generate a modified solar power generation level for the first photovoltaic installation, and evaluating a predictive model based on the modified solar power generation level and a current weather dataset to generate the solar power generation forecast.

18. The non-transitory computer-readable medium of any of clauses 11-17, further comprising mapping the first measurement device to the first photovoltaic installation based on a first proximity between the first measurement device and the first photovoltaic installation.

19. The non-transitory computer-readable medium of any of clauses 11-18, wherein the predictive model comprises a Machine Learning model that is trained, based on historical solar power generation levels associated with the first photovoltaic installation and historical weather data, to predict changes in solar power generation levels associated with the first photovoltaic installation in response to changes in weather data.

20. Some embodiments include a system, comprising a memory that stores a forecast engine, and a processor that, when executing the forecast engine, is configured to perform the steps of generating a first clear-sky solar power generation level corresponding to a first photovoltaic installation, wherein the first clear-sky solar power generation level indicates an amount of electricity generated by the first photovoltaic installation under clear-sky conditions, generating a first measurement device index corresponding to a first measurement device, wherein the first measurement device index indicates an amount of cloud cover present at a location where the first measurement device resides, and generating a solar power generation forecast for a geographical area based, at least in part, on the first clear-sky solar power generation level and the first measurement device index.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," "system," or "computer." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present invention of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method comprising:
generating, by a first computing device, a first clear-sky solar power generation level corresponding to a first photovoltaic installation in a target geographical area, wherein the first clear-sky solar power generation level indicates an amount of electricity generated by the first photovoltaic installation under clear-sky conditions;
generating, by the first computing device, a first measurement device index corresponding to the target geographical area based on measurement data received from a first measurement device located in the target geographical area, wherein the first measurement device index indicates an amount of cloud cover present at a location of the first measurement device; and
generating, by the first computing device, a solar power generation forecast that indicates an estimated amount of electricity generated by the first photovoltaic installation in the target geographical area based, at least in part, on the first clear-sky solar power generation level and the first measurement device index.

2. The method of claim 1, wherein generating the first clear-sky solar power generation level comprises:
generating an estimated clear-sky solar power generation level based on a first insolation level associated with the first photovoltaic installation; and
modifying the estimated clear-sky solar power generation level based on at least one configuration parameter associated with the first photovoltaic installation.

3. The method of claim 2, wherein generating the estimated clear-sky solar power generation level comprises evaluating a parametric model of a photovoltaic installation based on the first insolation level.

4. The method of claim 2, wherein modifying the estimated clear-sky solar power generation level comprises multiplying the estimated clear-sky solar power generation level by a number of solar panels included in the first photovoltaic installation.

5. The method of claim 1, wherein generating the first clear-sky solar power generation level comprises:

generating a first solar region associated with the target geographical area based on at least one physical attribute of the target geographical area;

assigning the first solar region to the first photovoltaic installation based on a first location where the first photovoltaic installation is located;

mapping the first photovoltaic installation to a first prototype photovoltaic installation based on at least one operational parameter associated with the first photovoltaic installation; and evaluating a parametric model of the first prototype photovoltaic installation based on an insolation level associated with the first solar region.

6. The method of claim 5, wherein the at least one physical attribute of the target geographical area comprises a topology associated with an electricity distribution infrastructure located within the target geographical area.

7. The method of claim 5, wherein the at least one physical attribute of the target geographical area comprises a first geospatial boundary that demarcates a first portion of the target geographical area.

8. The method of claim 5, wherein the at least one physical attribute of the target geographical area comprises a first climate zone corresponding to a first portion of the target geographical area.

9. The method of claim 5, wherein assigning the first solar region to the first photovoltaic installation comprises determining that the first location is included within a first portion of the target geographical area that is associated with the first solar region.

10. The method of claim 5, wherein mapping the first photovoltaic installation to the first prototype photovoltaic installation comprises determining, based on a library of prototype photovoltaic installations, that the first prototype photovoltaic installation is associated with the at least one operational parameter.

11. A non-transitory computer-readable medium storing program instructions that, when executed by a processor cause the processor to perform the steps of:

generating a first clear-sky solar power generation level corresponding to a first photovoltaic installation in a target geographical area, wherein the first clear-sky solar power generation level indicates an amount of electricity generated by the first photovoltaic installation under clear-sky conditions;

generating a first measurement device index corresponding to the target geographical area based on measurement data received from a first measurement device located in the target geographical area, wherein the first measurement device index indicates an amount of cloud cover present at a location of the first measurement device; and generating a solar power generation forecast that indicates an estimated amount of electricity generated by the first photovoltaic installation in the target geographical area based, at least in part, on the first clear-sky solar power generation level and the first measurement device index.

12. The non-transitory computer-readable medium of claim 11, wherein the step of generating the first clear-sky solar power generation level comprises:

generating an estimated clear-sky solar power generation level based on a first insolation level associated with the first photovoltaic installation; and modifying the estimated clear-sky solar power generation level based on at least one configuration parameter associated with the first photovoltaic installation.

13. The non-transitory computer-readable medium of claim 12, wherein generating the estimated clear-sky solar power generation level comprises evaluating a parametric model of the first photovoltaic installation based on the first insolation level.

14. The non-transitory computer-readable medium of claim 12, wherein modifying the estimated clear-sky solar power generation level comprises multiplying the estimated clear-sky solar power generation level by a number of solar panels included in the first photovoltaic installation.

15. The non-transitory computer-readable medium of claim 11, wherein the step of generating the first measurement device index comprises:

determining a maximum output level that is associated with the first measurement device and corresponds to a current point in time;

determining a current output level that is associated with the first measurement device and corresponds to the current point in time; and scaling the current output level based on the maximum output level to generate a value between zero and one.

16. The non-transitory computer-readable medium of claim 15, wherein determining the maximum output level comprises:

evaluating a historical dataset to determine one or more historical output levels recorded prior to the current point in time; and determining a maximum historical output level within the one or more historical output levels.

17. The non-transitory computer-readable medium of claim 11, wherein the step of generating the solar power generation forecast for the target geographical area comprises:

modifying the first clear-sky solar power generation level based on the first measurement device index to generate a modified solar power generation level for the first photovoltaic installation; and evaluating a predictive model based on the modified solar power generation level and a current weather dataset to generate the solar power generation forecast.

18. The non-transitory computer-readable medium of claim 11, further comprising mapping the first measurement device to the first photovoltaic installation based on a first proximity between the first measurement device and the first photovoltaic installation.

19. The non-transitory computer-readable medium of claim 17, wherein the predictive model comprises a Machine Learning model that is trained, based on historical solar power generation levels associated with the first photovoltaic installation and historical weather data, to predict changes in solar power generation levels associated with the first photovoltaic installation in response to changes in weather data.

20. A system, comprising:

one or more processors; and a memory storing instructions that when executed by the one or more processors causes the system to perform operations comprising:

generating a first clear-sky solar power generation level corresponding to a first photovoltaic installation in a target geographical area, wherein the first clear-sky solar power generation level indicates an amount of electricity generated by the first photovoltaic installation under clear-sky conditions, generating a first measurement device index corresponding to the target geographical area based on measurement data received from a first measurement device located in the target geographical area, wherein the first measurement device index indicates an amount of cloud cover present at a location of the first measurement device, and generating a solar power generation forecast that indicates an estimated amount of electricity generated by the first photovoltaic installation in the target geographical area based, at least in part, on the first clear-sky solar power generation level and the first measurement device index.

\* \* \* \* \*